J. M. HANSEN.
CAR DOOR OPERATING MECHANISM.
APPLICATION FILED APR. 27, 1910.
1,008,461.
Patented Nov. 4, 1911.
2 SHEETS—SHEET 2.
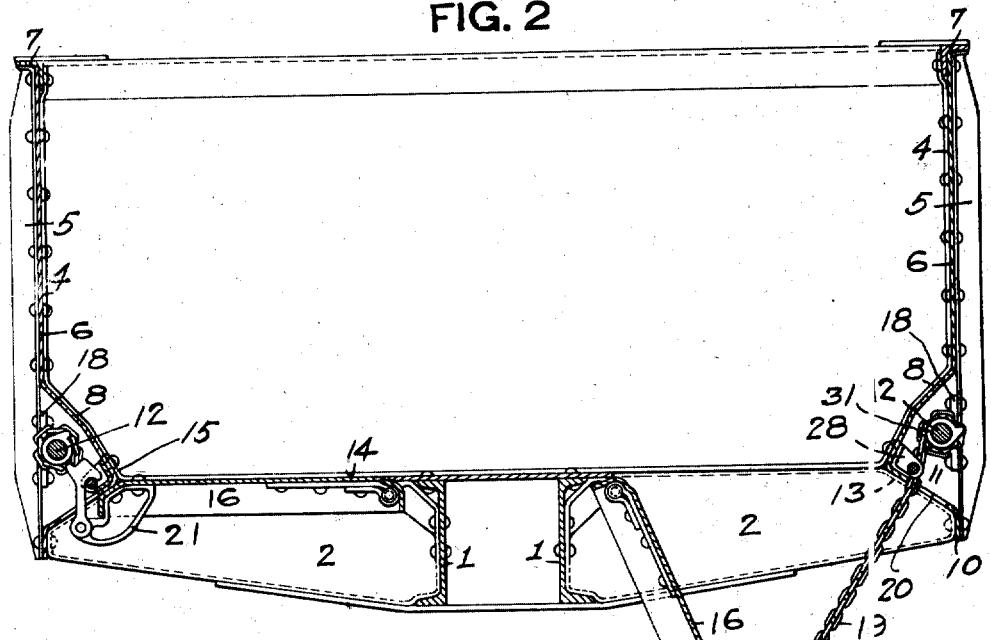
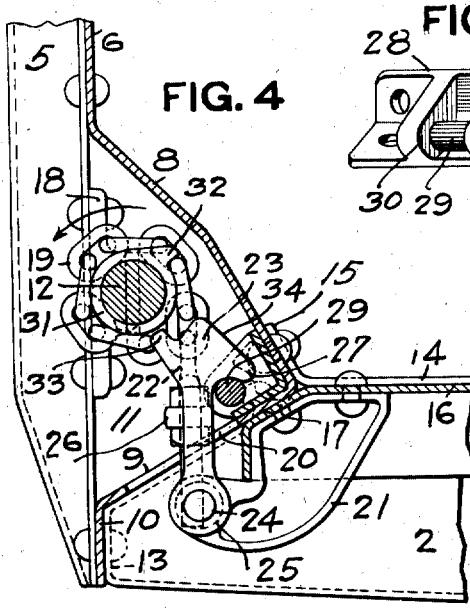
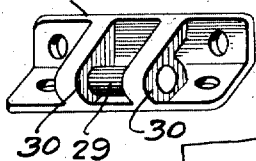
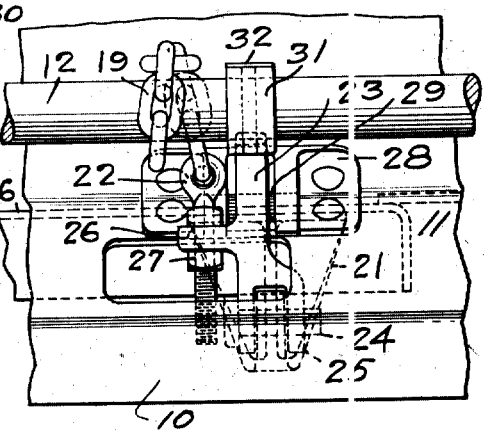
WITNESSES.
J. R. Keller
John F. Mill
INVENTOR.
John M. Hansen
By King & Fisher
attys

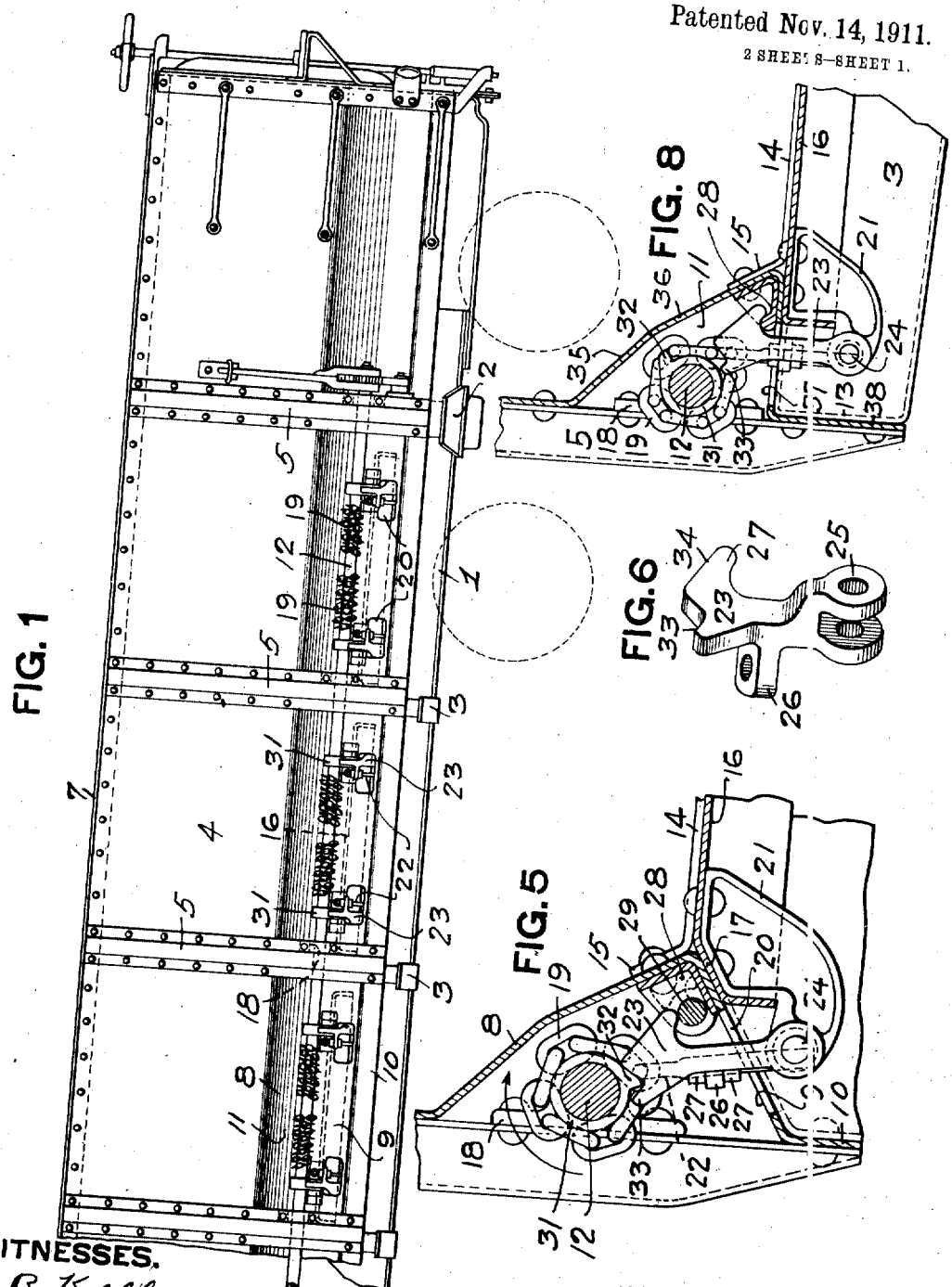

UNITED STATES PATENT OFFICE.

JOHN M. HANSEN, OF PITTSBURGH, PENNSYLVANIA.

CAR-DOOR-OPERATING MECHANISM.

1,008,461.  Specification of Letters Patent. Patented Nov. 14, 1911.

Application filed April 27, 1910. Serial No. 558,031.

*To all whom it may concern:*

Be it known that I, JOHN M. HANSEN, a resident of Pittsburgh, in the county of Allegheny and State of Pennsylvania, have invented a new and useful Improvement in Car-Door-Operating Mechanism; and I do hereby declare the following to be a full, clear, and exact description thereof.

My invention relates to car door operating mechanism, and is especially adapted for combined freight and dump cars, though it is adapted for use with any suitable kind of car doors. Its object is to provide a simple form of operating mechanism by which the weight is automatically taken from the lifting mechanism to hold the door in closed position and the supporting means so provided are automatically thrown out of engagement in the turning of the operating shaft in the opposite direction.

It consists, generally stated, in combining with a car body having a support thereon, a hinged door, a rotatable shaft for raising the door to closed position, and a hook carried by the door and adapted when the door is raised to engage with the support on the car body to hold the door closed; together with means on the rotating shaft adapted to engage with the hook and draw it away from the support when the door is to be lowered.

It also consists of other improvements as hereinafter set forth.

In the accompanying drawing Figure 1 is a side view of a car embodying the invention; Fig. 2 is a cross section thereof; Fig. 3 is an enlarged side view of the car door operating mechanism; Figs. 4 and 5 are enlarged cross sections showing the locking mechanism in different positions; Figs. 6 and 7 are perspective views of the locking hook and support respectively, and Fig. 8 is a detail view of a modification.

The invention is illustrated in connection with a combined freight and dump car, that is, a car having a substantially flat floor and vertical sides, and with doors swinging out to the car sides. It is also shown in connection with the car body forming the subject matter of a companion application of even date herewith, Serial No. 558,032, in which the pocket for the rotating shaft is formed by bending the bottom portion of the plate forming the car side inwardly from the vertical stiffener or stake and again outwardly to the same, forming an exposed pocket on the outside of the car in which the door closing mechanism is protected from blows from passing trains and the like by means of the side stakes, thus giving free access to the door operating mechanism from the side of the car. The car door operating mechanism forming the subject of this application is specially adapted for use within such pocket and will be described in connection with the same, though it can of course be employed in connection with any car door and may be supported in any suitable way.

The car body as illustrated has the center sills 1, the bolsters 2, transoms 3, the car sides 4, as well as the other elements necessary to form the car body. The car sides 4 as illustrated are of plate girder form, having the side plates 6 and vertical stiffeners or stakes 5 and the usual top chords 7. To form a pocket for the reception of the winding shaft and to form the bottom chord of the plate girder side the bottom of the plate 6 is bent inwardly at a downward incline as at 8 and then again bent outwardly preferably at a downward incline as at 9, the base of the plate being bent downwardly in line with the upper part of the plate as at 10, thus forming a triangular pocket 11 to receive the chain shaft 12. The base portion of the side plate thus forms the bottom chord of the plate girder side and as riveted to the side stake 5 above and below the pocket gives a very strong construction, while providing the pocket 11 on the outside of the car body where the lifting and locking mechanism is exposed on the car side, giving easy access thereto. In erecting the car the bolsters or transoms 2 or 3 are provided with suitable angles or flanges 13 to be riveted both to the lower incline 9 and the lower vertical flange 10 of the side plate and to the base of the stiffener as indicated. Suitable transverse floor plates 14 extend over the tops of the bolsters and transoms, and are connected to the walls of the triangular pockets such as by the upturned flange 15 riveted to the inclined wall 8. The doors 16 are shown as hinged to the center sills and are illustrated as formed of flanged plates fitting into the pockets formed for their reception in the openings formed in the floor. At the forward edge of each door it is inclined as at 17 to fit against the inclined wall 9 of the pocket.

The winding shaft 12 is mounted within the triangular pocket 11 in any suitable way, such as by brackets 18 riveted to the stakes 5, and it may have any suitable connection with the door for lifting the same to closed position. I have illustrated the chains 19 secured to the shaft and extending down through openings 20 in the inclined wall 9 of the car side and engaging with brackets 21 riveted to the outer edge of the door. As illustrated in the drawing I prefer these chains to connect to eye-bolts 22 which are secured to the hooks 23, said hooks being pivotally connected at 24 to the brackets 21. Any suitable connection between the door and winding shaft may of course be employed. The preferred shape of these hooks 23 is illustrated in Fig. 6, the hook having the bearings 25 and above the same the side lug 26 in which the eye-bolt 22 is secured by means of nuts 27, as illustrated, giving adjustment to the chain connection. Above the side lug 26 is the hook projection 27 which extends inwardly and engages with the door support 28 connected to the car body. As illustrated in the enlarged views and in Fig. 7, this support 28 is preferably formed as a casting adapted to be riveted to the car body within the pocket 11 and at the meeting points of the walls 8 and 9 forming the exposed pocket 11; and it has the bearings 30 to support the cross bar or lug 29 extending between said bearings and forming the door support. Secured upon the winding shaft in line with each hook 23 is the knocker 31 carrying a lug 32 which engages with a shoulder 33 upon the hook 23. Said knocker is located in such position that when the shaft is rotated in the direction to release the doors its lug 32 will contact with the shoulder 33 and so draw the hook away from the supporting bar 29 and release the hook from engagement therewith. The operating shafts can be made of any desired length and may extend toward or to the end of the car according to the number of doors formed in the car bottom, and may be operated by any suitable mechanism, which it is not considered necessary to illustrate.

In the use of the invention, when the door is open, as illustrated to the right of Fig. 2, and it is desired to close the door, the shaft 12 is rotated to wind up the chain such as in the direction of the arrow in Fig. 4, and, when the door is brought into position for closing, the hook 23 passes through the opening 20 in the bottom wall 9 and its upper inclined face 34 contacts with the supporting bar or lug 29 and is forced outwardly as the shaft is turned until the hook projection 27 passes said bar, when it snaps back over the bar and catches thereon as illustrated in Fig. 4 and to the left in Fig. 2, thus locking the door in closed position and supporting it upon the body and relieving the winding shaft of the entire load thereon. The drawing shows two such hooks for each door and this is the preferred construction. In order to open the door the shaft 12 is rotated in the opposite direction as indicated by the arrow in Fig. 5, and in the first turn thereof the lug 32 of the knocker 31 strikes against the shoulder 33 of the hook and draws it outwardly away from the supporting bar or lug 29 and so frees the hook from its support and leaves the door free to swing downwardly.

As the invention is preferably employed with a car of the construction shown in the drawing it will be seen that when the door is held closed, as the support 28 is about in line with the top of the door a short positive support close to the meeting faces of the door and car body is provided, and the inclined face 17 of the door is held in close contact with the bottom inclined wall 9 of the pocket 11, so practically sealing the joint between the door and car body. In closing the door the line of strain from the bracket 21 to the winding shaft 12 is directly through the body of the hook 23 and in such line as will normally hold the hook in engagement with the supporting bar or lug, while the lower face of the hook may be slightly inclined to hold the hook in engagement with said lug, though the locking of the chain shaft would prevent the outward movement of the hook necessary to disengage it until the chain is loosened and some positive means such as the lug on the knocker is employed to disengage the hook.

Fig. 8 shows a modification in which the bottom chord 35 is formed with the inclined portion 36, and the bottom portion 37 first bent outwardly on a horizontal plane instead of inclined as in the other figures, and then downwardly as at 38 and riveted to the stake and cross member. Otherwise it is the same as in the other figures.

The apparatus is simple in construction and as the hook is itself part of the lifting mechanism the only additions necessary over the ordinary chain winding device is the hook projection and the support with which it engages on the car body, an extremely simple car door supporting mechanism being thus provided.

What I claim is:

1. In car door operating mechanism, the combination of a car body provided with a door support, a hinged door, a swinging hook mounted thereon adapted to engage said door support, a winding shaft mounted on said car body and provided with a flexible connection to said door, and means on said shaft for engaging with said hook to remove it from said support, substantially as described.

2. In car door operating mechanism, the combination of a car body provided with a door support, a hinged door, a hook pivotally mounted thereon and adapted to engage with said support, a winding shaft mounted on said car body, a flexible connection between said hook and said winding shaft, and means carried by said shaft to disengage said hook and said support.

3. In car door operating mechanism, the combination of a car body having a door support, a winding shaft mounted on said car body, a hinged door, a hook mounted on said door and adapted to engage with the door support on the car body, and a chain connected to said hook and the winding shaft.

4. In car door operating mechanism, the combination of a car body having a supporting lug, a winding shaft mounted on said car body above said lug, a hinged door, a hook mounted on said door and having an upper inclined face, and a chain connected to the hook and the winding shaft, whereby as the door is raised the said inclined face contacts with the lug on the car body and is forced outwardly thereby and the hook snaps over said lug when raised to proper height.

5. In car door operating mechanism, the combination of a car body having a door support, a winding shaft mounted on said body, a hinged door, a hook mounted on said door and adapted to engage with the door support on said body, and a knocker carried by the winding shaft and adapted to draw the hook from engagement with the door support.

6. In car door operating mechanism, the combination of a car body having a supporting lug, a winding shaft mounted on said body, a hinged door, a hook mounted on said door and adapted to engage with the lug on said body, and a knocker secured to the winding shaft and having a lug adapted to engage with the hook and release it from the supporting lug.

7. In car door operating mechanism, the combination of a car body having a door support, a winding shaft mounted on said car body, a hinged door, a hook mounted on the door and having a shoulder and a hook projection to engage with the door support, and a knocker secured to the winding shaft and having a lug to engage with the shoulder of the hook and draw it away from the door support.

8. In car door operating mechanism, the combination of a car body having a door support, a winding shaft mounted therein, a car door, a hook mounted on said car door and adapted to engage with the door support on the car body, said hook having a side lug, and a chain connected to the winding shaft and to the side lug of the hook.

9. In car door operating mechanism, the combination of a car body having a support 28 secured thereto and having the bearings 30 supporting the lug 29, a hinged door, and a hook 23 mounted thereon and provided with the hook projection 27 adapted to pass between the bearings 30 and engage with the lug 29.

10. In car door operating mechanism, the combination of a car body having a support 28 secured thereto and having the bearings 30 supporting the lug 29, a hinged door and a hook 23 mounted thereon provided with the hook projection 27 adapted to pass between the bearings 30 and engage with the lug 29, and also having a side lug 26, a winding shaft, and a chain connecting the side lug 26 and the winding shaft.

11. In car door operating mechanism, the combination of a car body having a lug, a hinged door, a hook 23 having the hook projection 27 and the shoulder 33, a winding shaft, a chain connecting said shaft and said hook and a knocker 31 secured to the winding shaft and provided with the lug 32 for engagement with the shoulder 33 of the hook.

In testimony whereof, I the said JOHN M. HANSEN have hereunto set my hand.

JOHN M. HANSEN.

Witnesses:
ROBERT C. TOTTEN,
JOHN F. WILL.